US012192277B2

(12) United States Patent
Dawkins et al.

(10) Patent No.: US 12,192,277 B2
(45) Date of Patent: *Jan. 7, 2025

(54) METHOD AND APPARATUS FOR USING NONSTOP CONTROLLER WITH LOCAL AREA NETWORK (LAN) FOR LOCAL CLOUD

(71) Applicant: Tencent America LLC, Palo Alto, CA (US)

(72) Inventors: Paul Spencer Dawkins, Garland, TX (US); Rohit Abhishek, Palo Alto, CA (US); Arianne Hinds, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,325

(22) Filed: Oct. 28, 2022

(65) Prior Publication Data

US 2023/0171310 A1 Jun. 1, 2023

Related U.S. Application Data

(60) Provisional application No. 63/284,534, filed on Nov. 30, 2021.

(51) Int. Cl.
*G06F 11/20* (2006.01)
*G06F 9/52* (2006.01)
(Continued)

(52) U.S. Cl.
CPC ............ *H04L 67/1095* (2013.01); *G06F 9/52* (2013.01)

(58) Field of Classification Search
CPC ....... H04L 67/1095; H04L 69/28; G06F 9/52; G06F 9/5066
See application file for complete search history.

(56) References Cited

U.S. PATENT DOCUMENTS 5,471,461 A 11/1995 Engdahl et al.
6,269,080 B1 * 7/2001 Kumar ................... H04L 47/10
709/224

(Continued)

OTHER PUBLICATIONS

International Search Report dated Mar. 2, 2023 issued by the International Searching Authority in Application No. PCT/US 22/48815.

(Continued)

*Primary Examiner* — Thu V Nguyen
*Assistant Examiner* — Golam Mahmud
(74) *Attorney, Agent, or Firm* — Sughrue Mion, PLLC (57) ABSTRACT

A method is performed by a network node connected to one or more additional network nodes via a local area network (LAN). The network node and the one or more additional network nodes form a cloud. The method includes setting a first timer to a first value, the first timer being associated with determining whether one of the one or more additional network nodes is an active controller in the cloud. The method includes starting the first timer. The method includes determining, before the first timer expires, whether a first message that indicates the one of the one or more additional network nodes is the active controller is received. Based on determining the first message is received before the first timer expires, the method includes synchronizing with the one of the one or more additional network nodes that is the active controller, and restarting the first timer.

17 Claims, 6 Drawing Sheets

(51) Int. Cl.
*G06F 11/14* (2006.01)
*H04L 67/1095* (2022.01)
*H04W 48/16* (2009.01)
*H04W 56/00* (2009.01)

(56) References Cited

U.S. PATENT DOCUMENTS

| | | | | |
|---|---|---|---|---|
| 7,639,663 B1* | 12/2009 | Nerses | .................... | H04W 8/04 |
| | | | | 370/347 |
| 8,089,872 B2* | 1/2012 | Balasaygun | .............. | H04L 9/40 |
| | | | | 370/395.2 |
| 10,761,520 B1* | 9/2020 | Boone | .................... | B25J 9/0084 |
| 11,144,358 B1* | 10/2021 | Noble | .................... | G06F 11/108 |
| 2006/0198346 A1* | 9/2006 | Liu | ....................... | H04W 40/24 |
| | | | | 370/254 |
| 2012/0167118 A1* | 6/2012 | Pingili | .................. | G06F 1/3206 |
| | | | | 719/318 |
| 2015/0195162 A1* | 7/2015 | Gandham | .............. | H04L 41/122 |
| | | | | 709/206 |
| 2015/0370827 A1* | 12/2015 | Parkison | ............... | G06F 16/178 |
| | | | | 707/610 |
| 2017/0013572 A1* | 1/2017 | Jayaraman | .......... | H04W 56/001 |
| 2017/0141950 A1* | 5/2017 | Wackerly | ............ | H04L 12/1886 |
| 2019/0082004 A1* | 3/2019 | Bosch | ..................... | H04L 67/10 |
| 2020/0244728 A1* | 7/2020 | Jha | ........................... | H04L 9/30 |
| 2021/0141346 A1 | 5/2021 | Wenzel et al. | | |

OTHER PUBLICATIONS

Written Opinion dated Mar. 2, 2023 issued by the International Searching Authority in Application No. PCT/US 22/48815.
Daniel Nicholas De Bruyn, "Investigation and development of a system for secure synchronisation of information in a wireless mesh network", Dec. 2010 (32 pages total), Retrieved from the Internet: http://ir.cut.ac.za/bitstream/handle/11462/132/De%20Bruyn%2C%20Daniel%20Nicholas.pdf?sequence=1&isAllowed=y.

* cited by examiner

METHOD AND APPARATUS FOR USING NONSTOP CONTROLLER WITH LOCAL AREA NETWORK (LAN) FOR LOCAL CLOUD

CROSS-REFERENCE TO RELATED APPLICATION

This application is based on and claims priority to U.S. Provisional Patent Application No. 63/284,534, filed on Nov. 30, 2021, the disclosure of which is incorporated by reference herein in its entirety.

TECHNICAL FIELD

The present disclosure relates generally to communication systems, and more particularly to methods and apparatuses for a nonstop controller with local area network (LAN) for local cloud.

BACKGROUND

Cloud computing may be defined to be an on-demand access, via internet, to computing resources, applications, servers, data storage, development tools, networking capabilities. Cloud computing services may be hosted at a remote data center managed by a cloud services provider (CSP). Cloud computing may be a subscription-based service. A cloud-based subscription helps to lower the resource cost by cutting down the purchase, installment, etc., cost. Cloud computing improves the agility and time-to-value and may be scaled more easily in a cost-effective manner.

Currently, applications are more focused on concepts of internet of things (IoT), Artificial Intelligence (AI), Machine learning (MI), Immersive Media. Furthermore, there is an exponential growth in the number of internet devices. Performing computation at data centers or cloud servers (potentially at a geographically distant location) may not be an efficient approach since these computations require significant bandwidth to move the data from the user to the cloud or data center and back, and also adds latency.

Edge computing brings the computing power closer to the users by placing the resources at the network edge, thereby reducing the network delay, reducing bandwidth requirement to upper cloud, enhancing reliability and cost reduction. Edge computing enables the computation of data closer to the user instead of travelling a farther distance going through multiple hops and relying on the cloud network.

The main benefit that network operators see in the use of edge computing is real-time dynamic computing being closer to the users, thereby reducing latency; cost reduction since users place less load on cloud servers; and higher quality of experience (QoE) since the local clouds are closer to the user, hence faster traffic delivery.

For immersive technologies like Lightfield, Augmented Reality (AR), and Virtual Reality (VR), a high-end hardware device is required. This requirement arises because these applications are likely to require a huge amount of processing power and storage to give the user the feeling of being in a truly immersive environment. Furthermore, these applications require real-time video stream processing to recognize specific objects, and some applications may even require generation of new video frames.

Therefore, the current challenges in using immersive technologies include the processing capacity, storage capacity, energy consumption, and weight of the device. All of these challenges are becoming more prominent due to the massive processing requirement of the applications running on the device. For immersive technologies which require users to wear a headset, heavy devices result in the user having an uncomfortable experience, and high processing capacity makes the device expensive including lightfield devices, which rely heavily on GPUs to meet the application's requirements. With limited resource availability at the device, processing tasks that require more than available resources would add computational latencies, and if a device is battery-powered, adding computational load exhausts the device's battery more quickly and shortens the service interval time between charges. Therefore, there exists a gap between the capabilities of the current state of the art and the requirements for future devices and systems.

If a device used for immersive technologies exists in isolation, the device itself must provide all the resources necessary to provide an acceptable QoE to the device's user. If the device is connected to other devices using a LAN, the device may request assistance from other devices on the LAN, using shared resources that are highly local to the device requesting assistance.

The reliability requirements for various applications of immersive technologies vary widely. In some use cases, such as recreational entertainment, occasional interruptions may be acceptable, as part of a tradeoff between cost and reliability. In other use cases, such as augmented reality assisted surgery, the costs of an outage may be much higher. One way to make these outages less frequent, and less likely, is to use a controller to distribute much of the computational load across multiple workers that then return the results of the computational tasks they have been assigned to the user's device, which marshals these results and presents them to the user, providing an immersive experience. But even this mitigation strategy may lead to outages where a controller becomes unresponsive. While it is possible to provide multiple controllers, so that if an active controller becomes unresponsive, another controller becomes the active controller, this newly active controller must go through the same process of recruiting participating worker devices, gathering offered resources into a pool that may be used on behalf of devices that request the use of shared resources, and assigning tasks to worker devices as the previously active controller performed, and during this time interval the user's immersive experience is interrupted.

In order to minimize this time interval, available controllers that are not currently active controllers may request that the active controller notify the available controller of changes in the active controller's state, so that available controllers are able to stay current with the active controller's state for participating devices that may request resources, participating workers that provide resources, and tasks assigned to workers. Using this procedure, a controller that becomes active because the previous active controller becomes unresponsive will be able to resume providing service to users of immersive devices as soon as they detect the unresponsive active controller.

SUMMARY

The following presents a simplified summary of one or more embodiments of the present disclosure in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments of the present disclosure in a simplified form as a prelude to the more detailed description that is presented later.

Methods, apparatuses, and non-transitory computer-readable mediums for a nonstop controller with local area network (LAN) for local cloud are disclosed by the present disclosure.

According to an exemplary embodiment, a method performed by at least one processor of a network node that is connected to one or more additional network nodes via a local area network (LAN), the network node and the one or more additional network nodes forming a cloud, the method including setting a first timer to a first value, the first timer being associated with determining whether one of the one or more additional network nodes is an active controller in the cloud. The method further includes starting the first timer. The method further includes determining, before the first timer expires, whether a first message that indicates the one of the one or more additional network nodes is the active controller is received. Based on determining the first message is received before the first timer expires, the method further includes synchronizing with the one of the one or more additional network nodes that is the active controller, and restarting the first timer.

According to an exemplary embodiment, an apparatus is connected to one or more additional network nodes via a local area network (LAN), where the apparatus and the one or more additional network nodes form a cloud. The apparatus includes at least one memory configured to store computer program code and at least one processor configured to access the computer program code and operate as instructed by the computer program code. The computer program code includes first setting code configured to cause the at least one processor to set a first timer to a first value, the first timer being associated with determining whether one of the one or more additional network nodes is an active controller in the cloud. The computer program code further includes first starting code configured to cause the at least one processor to start the first timer. The computer program code further includes determining code configured to cause the at least one processor to determine, before the first timer expires, whether a first message that indicates the one of the one or more additional network nodes is the active controller is received. The computer program code further includes synchronizing code and restarting code, where based on determining the first message is received before the first timer expires, the synchronizing code configured to cause the at least one processor to synchronize with the one of the one or more additional network nodes that is the active controller, and the restarting code configured to cause the at least one processor to restart the first timer.

According to an exemplary embodiment, a non-transitory computer readable medium having instructions stored therein, which when executed by a processor in a network node that is connected to one or more additional network nodes via a local area network (LAN), the network node and the one or more additional network nodes forming a cloud, causes the network node to execute a method. The method includes setting a first timer to a first value, the first timer being associated with determining whether one of the one or more additional network nodes is an active controller in the cloud. The method further includes starting the first timer. The method further includes determining, before the first timer expires, whether a first message that indicates the one of the one or more additional network nodes is the active controller is received. Based on determining the first message is received before the first timer expires, the method further includes synchronizing with the one of the one or more additional network nodes that is the active controller, and restarting the first timer.

Additional embodiments will be set forth in the description that follows and, in part, will be apparent from the description, and/or may be learned by practice of the presented embodiments of the disclosure.

BRIEF DESCRIPTION OF THE DRAWINGS

The above and other aspects will be apparent from the following description of various embodiments taken in conjunction with the accompanying drawings, in which.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Reference throughout this specification to "one embodiment," "an embodiment," or similar language means that a particular feature, structure, or characteristic described in connection with the indicated embodiment is included in at least one embodiment of the present solution. Thus, the phrases "in one embodiment", "in an embodiment," and similar language throughout this specification may, but do not necessarily, all refer to the same embodiment.

Furthermore, the described features, advantages, and characteristics of the present disclosure may be combined in any suitable manner in one or more embodiments. One skilled in the relevant art will recognize, in light of the description herein, that the present disclosure may be practiced without one or more of the specific features or advantages of a particular embodiment. In other instances, additional features and advantages may be recognized in certain embodiments that may not be present in all embodiments of the present disclosure.

Embodiments of the present disclosure solve the problem of using devices connected to a LAN as a non-stop service for a local cloud that shares the processing capacity of those devices. Embodiments of the present disclosure include a method and apparatus applicable for any LAN that (i) includes devices that are used for technologies that require high computational resources, including immersive technologies, but may not have sufficient resources to carry out all required computational tasks for these technologies on their own, (ii) includes devices that have sufficient resources to offer some resources to a local cloud, in order to use these shared resources when necessary, and (iii) includes at least two devices that are willing to act as local cloud controllers.

The term "device" may refer to all devices connected to the LAN with the ability to access resources available from the local cloud. The term "active controller" may refer to any device that identifies resources available to the local cloud and assigns tasks on behalf of devices. The term "worker" may refer to any device that is performing tasks as assigned by the active controller.

Figure 1:
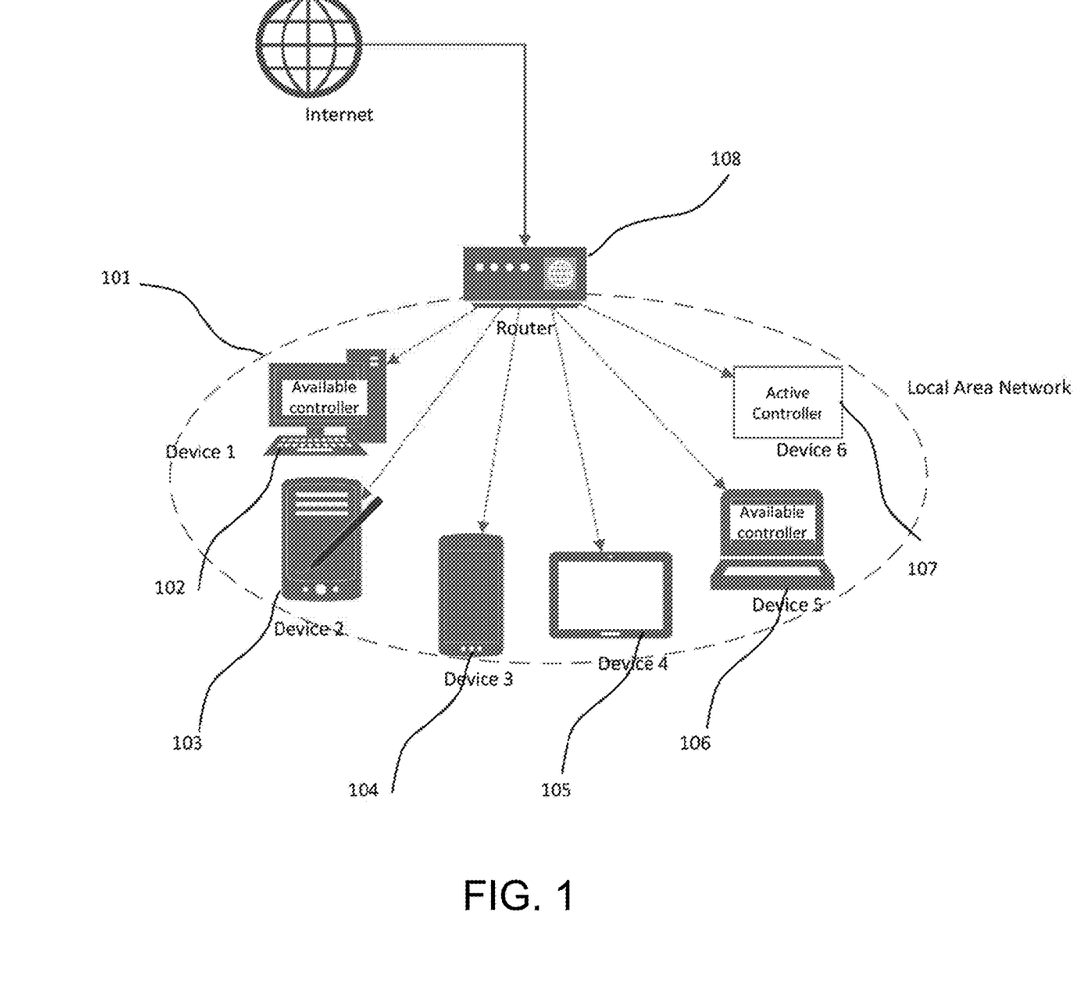
FIG. 1 is a diagram of a LAN including active and available controllers, in accordance with various embodiments of the present disclosure.

FIG. 1 illustrates an embodiment of a LAN network, where 108 is the gateway router for the LAN 101, and devices 102, 103, 104, 105, 106, and 107 are the different devices connected to the network. In some embodiments, resources from multiple devices connected to the LAN 101 may be used to create a local cloud. The setup may include any device in the LAN acting as active controller 107, which would be responsible for enlisting other devices within the LAN, and manage task assignment to those devices. "Managing task assignment" includes task migration between workers within the local cloud.

Various embodiments may be utilized for assigning the active controller for servicing requests and providing a highly available local cloud service. In FIG. 1, Device 6 (107) is serving as the active controller, but Device 1 (102) and Device 4 (106) may also be available to serve as the active controller if the current active controller becomes unresponsive.

Figure 2:
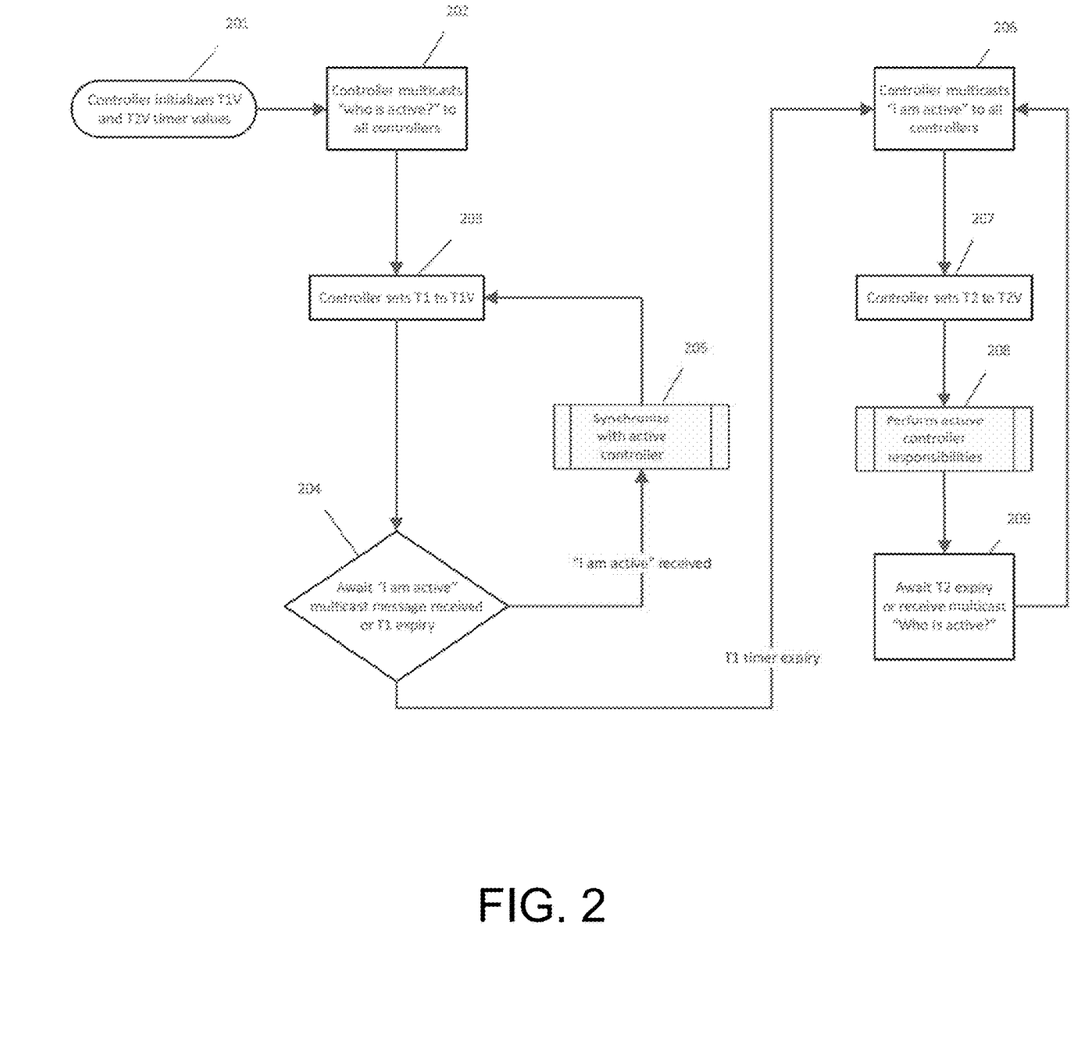
FIG. 2 is diagram of a controller-controller communication process, in accordance with various embodiments of the present disclosure.

FIG. 2 illustrates a flowchart of an embodiment of a process by which an available controller participates in a high-availability active controller selection process. The process may start at operation (201) where an available controller initializes two timers to two timer values, T1V and T2V, respectively. For example, the timers may be a T1 timer and a T2 timer. In some embodiments, the two timer values, T1V and T2V, may be predetermined. The timer values, T1V and T2V, may be used to limit the amount of time that no controller is active, if at least one controller is available. Timer value T1V may correspond to the amount of time that an available controller will wait for an indication that another controller is already active. Timer value T2V may correspond to the amount of time that an active controller will wait before sending an indication that it is already the active controller. In some embodiments, timer value T1V is longer than the timer value T2V. The timer values of T1V and T2V, and the ratio between T1V and T2V may be provisioned, may be determined experimentally, or may be determined adaptively. In some embodiments, a 3:1 ratio between the timer value T1V and the timer value T2V allows an available controller to receive at least two "I am active" messages, unless the previously active controller is no longer active, in which case the available controller may assume the role of an active controller.

In some embodiments, in order to avoid synchronization between available controllers that might all declare themselves active simultaneously (for example, after all of the devices on the LAN are powered on at the same time), each available controller may add a small randomly selected time interval to the T1 timer after setting the T1 timer to T1V. In some embodiments, the device that announces itself first as the available controller may have priority to become the active controller.

The process proceeds from operation (201) to operation (202) where the available controller sends a "who is active?" message to the "all controllers" multicast group. At operation (203), the available controller sets the T1 timer to T1V. At operation (204), the available controller waits for either an "I am active" multicast message to arrive from a currently active controller, or the T1 timer to expire. If the "I am active" message is received, the process proceeds to operation (205) for synchronizing with the active controller, as disclosed in further detail with respect to FIG. 5. The process proceeds from operation (205) to operation (203) and repeats operation (203).

If the T1 timer is expired, which indicates the LAN does not include an active controller, the process proceeds from operation (204) to operation (206). At operation (206), the available controller multicasts an "I am active" message to all controllers to become the active controller. At operation (207), the active controller sets the T2 timer to T2V. At operation (208), the active controller performs the responsibilities of an active controller as described in FIG. 3 and FIG. 4. At operation (209), the active controller waits for either a "who is active?" multicast message to arrive from a currently active controller, or the T2 timer to expire. If either one of these conditions are met, the process returns to operation (206). While waiting, the active controller may also receive requests for local cloud resources and identifying workers with resources to satisfy those requests. Regardless of whether the active controller is awakened by the reception of a "who is active?" multicast message or the expiration of the T2 timer, the active controller sends a multicast "I am active" message to all available controllers at operation (206), sets the T2 timer to T2V at operation (207), and then waits as before at operation (208). Once an available controller becomes the active controller, this controller may continue to operate as the active controller for an indefinite period of time.

Figure 3:
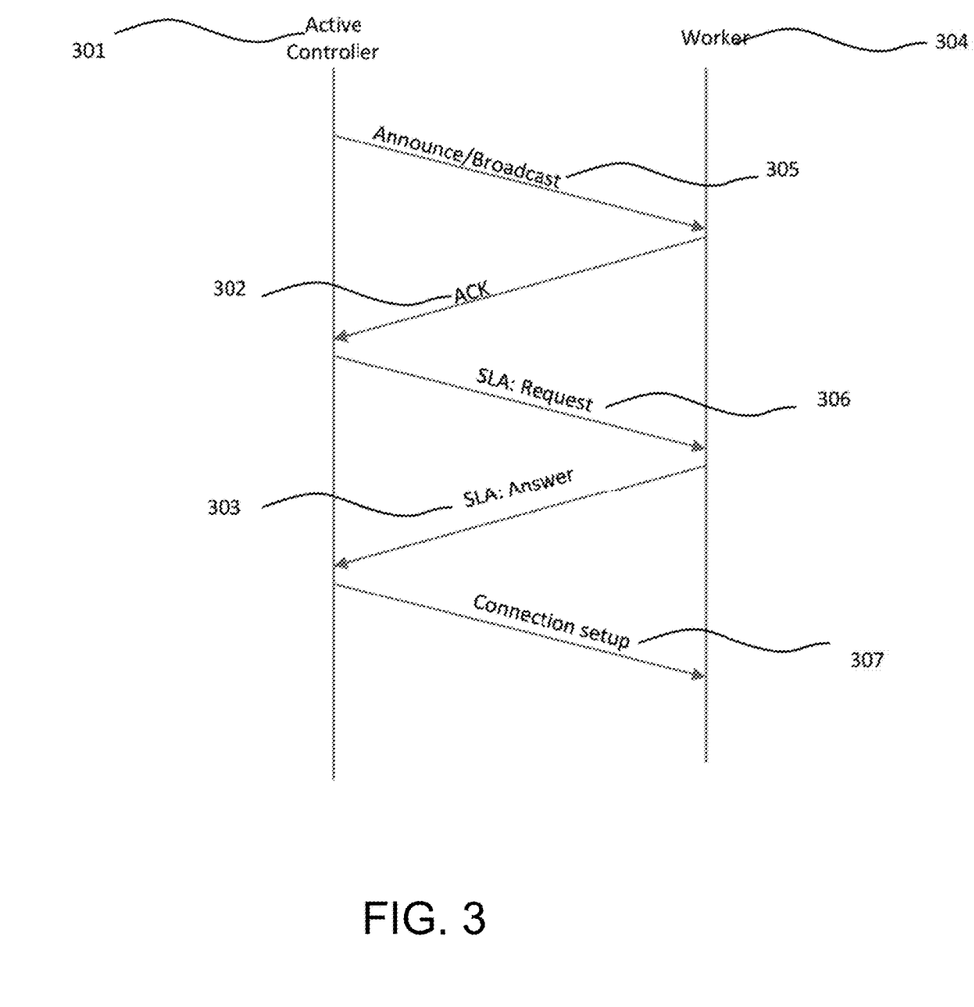
FIG. 3 is a diagram of an active controller-worker connection setup, in accordance with various embodiments of the present disclosure.

FIG. 3 illustrates an embodiment of the active controller (301)-worker (304) connection setup. When a request for a local cloud comes, the active controller (301) may broadcast messages to discover workers (304) connected to the LAN. If a device agrees to provide resources to the local cloud, the device may send an acknowledgement (302) to the active controller. The active controller may then respond with the SLA request (306), which may include requests for the worker to share the worker's resources including the resource availability time and the power availability. If the worker agrees, the worker may send an SLA answer (303), after which the active controller may setup the connection (307). The worker may also need to share information such as a number of active apps on the worker and the energy consumption of the worker. The worker may also be required to share such information during the session.

Figure 4:
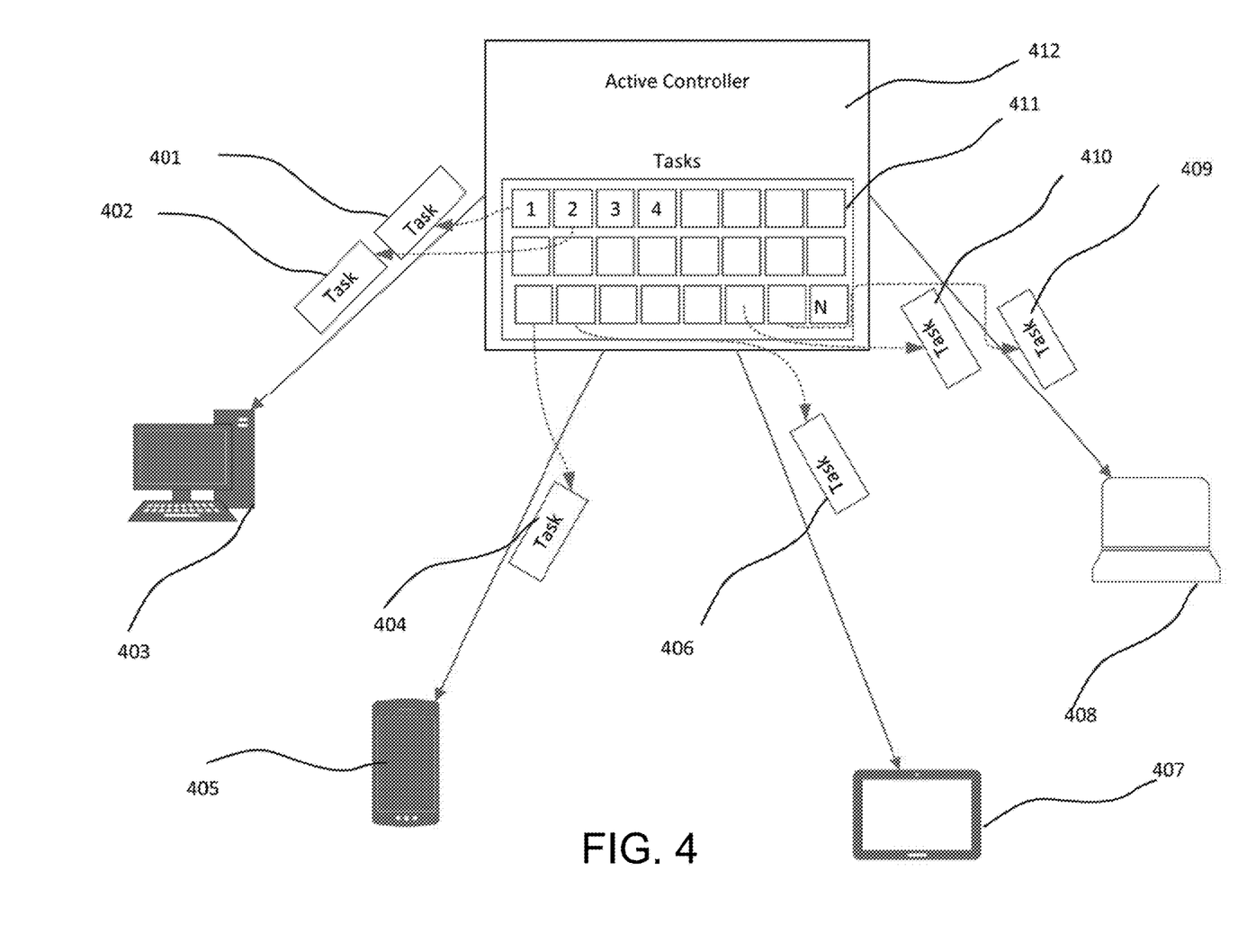
FIG. 4 is a diagram of an active controller-worker task assignment, in accordance with various embodiments of the present disclosure.

After the active controller receives the SLA answer from the worker, the active controller may start assigning tasks to the various workers. FIG. 4 illustrates an embodiment of the active controller-worker task assignment. The tasks (411) may correspond to one or more tasks the active controller (412) needs to assign to the workers (403), (405), (407), and (408). The active controller may divide the one or more tasks into sub-tasks (401), (402), (404), (406), (409), and (410).

Figure 5:
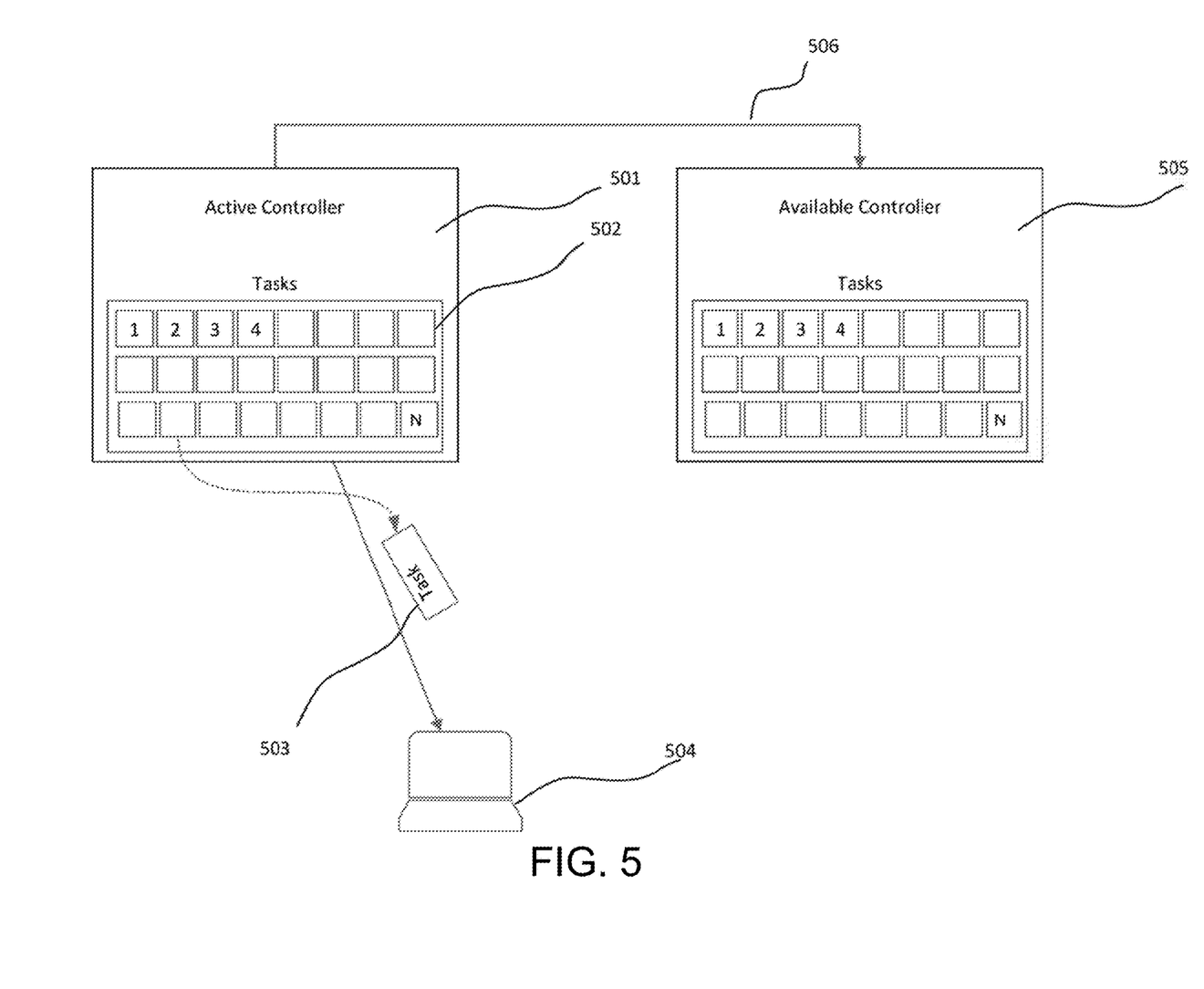
FIG. 5 is a diagram illustrating synchronization between an active controller and an available controller.

FIG. 5 illustrates an embodiment of an active controller (501) that is assigning a task (502) to workers, where a subtask (503) of this task is assigned to a worker (504). Since the active controller is updating its internal state, an available controller (505) may also updates its internal state (506).

In some embodiments, the active and available controllers may use a variety of mechanisms to ensure state synchronization, including, but not limited to: (i) using a publish/subscribe mechanism, where the available controller subscribes to the active controller for state updates, and the active controller publishes state updates; (ii) using a multicast mechanism, where the active controller multicasts state updates to the listening available controller; and (iii) using a polling mechanism, where the available controller polls the active controller for state updates.

In some embodiments, the granularity of state synchronization may vary, including, but not limited to (i) synchronizing the state of the set of devices requesting resources; (ii) synchronizing the state of the set of workers; (iii) synchronizing the state of the set of tasks; (iii) synchronizing the state of task assignments to workers; and (iv) synchronizing the state of the results of task assignments to workers.

In some embodiments, the active controller and available controller may use these synchronizations in various combinations. The choice of what is being synchronized may be guided by a variety of methods, including simulations, operational experience, or dynamic adjustment based on recent experience.

In some embodiments, the active controller may use the worker's resource availability (e.g., storage the worker is willing to lease, the total storage capacity of the worker, power availability of the worker, etc.) to assign tasks. In some embodiments, a worker may notify the active controller to update the worker's willingness to provide resources for various reasons, including, but not limited to, unrelated local computation using some of the worker's resources.

In some embodiments, if due to some reason the worker no longer wants to be used, the worker may notify the active controller of this change in participation. The worker may not disconnect right away. Instead, the active controller may check if there is any active task running on the worker. The worker may choose to finish the current task before disconnecting or may wait for the active controller to migrate the task to some other worker in the network. In case the worker disconnects due to network issues or any other issues, the active controller may reassign the task allocated to the disconnected worker to some other worker in the network.

In some embodiments, if the active controller becomes unresponsive and another controller is available, a new active controller may be selected using the process illustrated in FIG. 2. In some embodiments, a local cloud may be used as a subscription-based service where the owner of the LAN leases computing and storage resources in-return of payment. An example may be using the local cloud to storage images/files or performing some image processing tasks. The local area cloud may also be used to perform any task for any device within its network. For example, if any device in the network is streaming immersive media, and if the device does not have enough resources to process incoming media streams (decoding, stitching), the device may ask the active controller in the network to process the media on the device's behalf.

The methodology to use LAN as non-stop service for local cloud may be implemented as computer software using computer-readable instructions and physically stored in one or more computer-readable media. For example, FIG. 6 illustrates an embodiment of a computer system 600 suitable for implementing certain embodiments of the disclosed subject matter.

The computer software may be coded using any suitable machine code or computer language that may be subject to assembly, compilation, linking, or like mechanisms to create code comprising instructions that may be executed directly, or through interpretation, micro-code execution, and the like, by computer central processing units (CPUs), Graphics Processing Units (GPUs), and the like.

The instructions may be executed on various types of computers or components thereof, including, for example, personal computers, tablet computers, servers, smartphones, gaming devices, internet of things devices, and the like.

Figure 6:
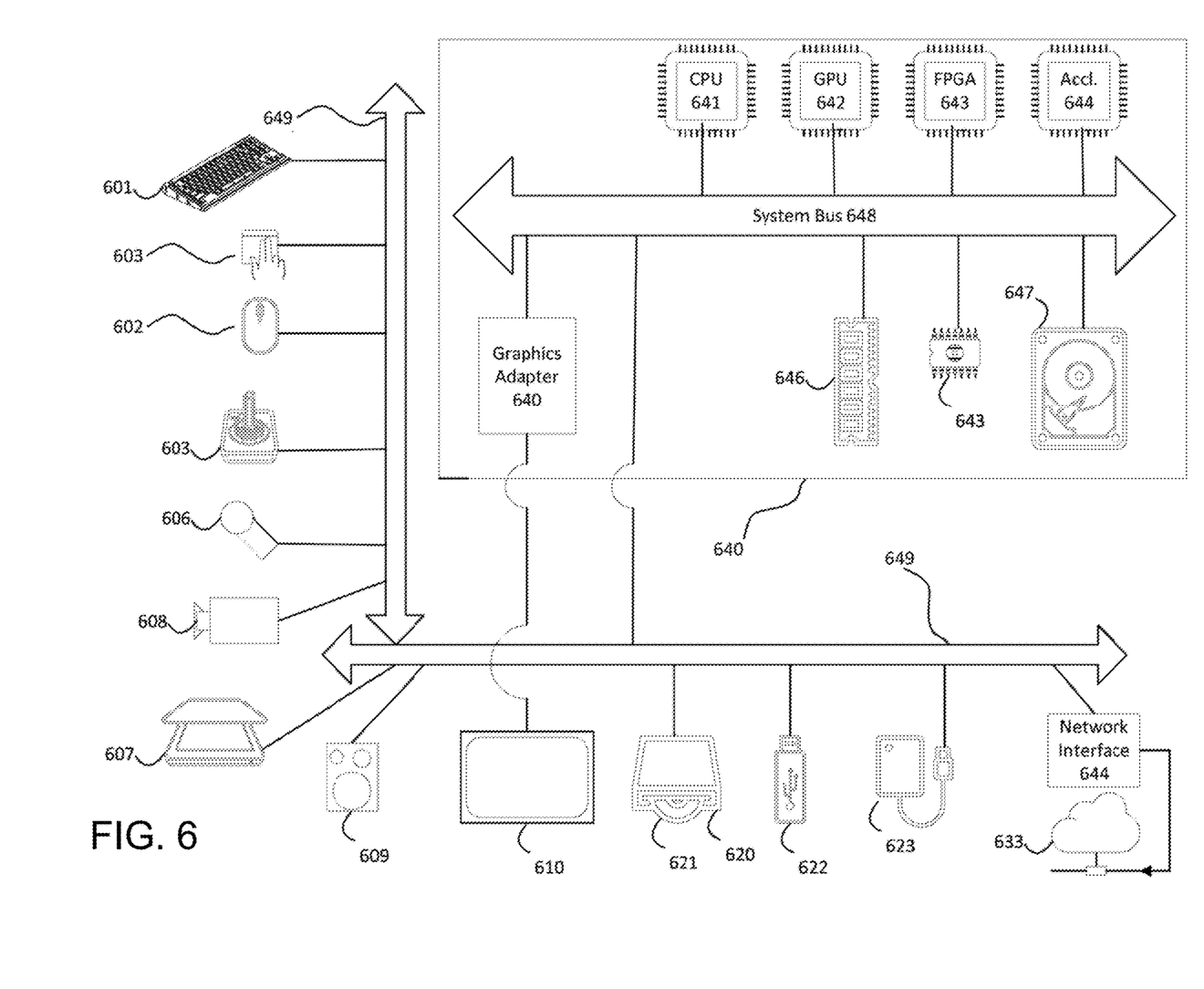
FIG. 6 is a schematic illustration of a computer system, in accordance with various embodiments of the present disclosure.

The components shown in FIG. 6 for computer system (600) are exemplary and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (600).

Computer system (600) may include certain human interface input devices. Such a human interface input device may be responsive to input by one or more human users through, for example, tactile input (such as keystrokes, swipes, data glove movements), audio input (such as voice, clapping), visual input (such as gestures), olfactory input (not depicted). The human interface devices may also be used to capture certain media not necessarily directly related to conscious input by a human, such as audio (such as speech, music, ambient sound), images (such as scanned images, photographic images obtained from a still image camera), video (such as two-dimensional video, three-dimensional video including stereoscopic video).

Input human interface devices may include one or more of (only one of each depicted): keyboard (601), mouse (602), trackpad (603), touch screen (610), data-glove (not depicted), joystick (605), microphone (606), scanner (607), camera (608).

Computer system (600) may also include certain human interface output devices. Such human interface output devices may be stimulating the senses of one or more human users through, for example, tactile output, sound, light, and smell/taste. Such human interface output devices may include tactile output devices (for example, tactile feedback by the touch-screen (610), data-glove (not depicted), or joystick (605), but there may also be tactile feedback devices that do not serve as input devices), audio output devices (such as speakers (609), headphones (not depicted)), visual output devices (such as screens (610) to include CRT screens, LCD screens, plasma screens, OLED screens, each with or without touch-screen input capability, each with or without tactile feedback capability—some of which may be capable to output two-dimensional visual output or more than three-dimensional output through means such as stereographic output; virtual-reality glasses (not depicted), holographic displays and smoke tanks (not depicted)), and printers (not depicted).

Computer system (600) may also include human accessible storage devices and their associated media such as optical media including CD/DVD ROM/RW Z20 with CD/DVD or the like media (621), thumb-drive (622), removable hard drive or solid-state drive (623), legacy magnetic media such as tape and floppy disc (not depicted), specialized ROM/ASIC/PLD based devices such as security dongles (not depicted), and the like.

Those skilled in the art should also understand that term "computer-readable media" as used in connection with the presently disclosed subject matter does not encompass transmission media, carrier waves, or other transitory signals.

Computer system (600) may also include an interface to one or more communication networks. Networks can, for example, be wireless, wireline, optical. Networks may further be local, wide-area, metropolitan, vehicular, and industrial, real-time, delay-tolerant, and so on. Examples of networks include LANs such as Ethernet, wireless LANs, cellular networks to include GSM, 3G, 4G, 5G, LTE, and the like, TV wireline or wireless wide-area digital networks to include cable TV, satellite TV, and terrestrial broadcast TV, vehicular and industrial to include CANBus, and so forth. Certain networks commonly require external network interface adapters that are attached to certain general-purpose data ports or peripheral buses (649) (such as, for example, USB ports of the computer system (600); others are commonly integrated into the core of the computer system (600) by attachment to a system bus as described below (for example Ethernet interface into a PC computer system or cellular network interface into a smartphone computer system). Using any of these networks, the computer system (600) may communicate with other entities. Such communication may be uni-directional, receive only (for example, broadcast TV), uni-directional send-only (for example, CANbus to certain CANbus devices), or bi-directional, for example, to other computer systems using local or wide area digital networks. Certain protocols and protocol stacks may be used on each of those networks and network interfaces, as described above.

The aforementioned human interface devices, human-accessible storage devices, and network interfaces may be attached to a core (640) of the computer system (600).

The core (640) may include one or more Central Processing Units (CPU) (641), Graphics Processing Units (GPU) (642), specialized programmable processing units in the form of Field Programmable Gate Areas (FPGA) (643), hardware accelerators for certain tasks (644), and so forth. These devices, along with Read-only memory (ROM) (645), Random-access memory (646), internal mass storage such as internal non-user accessible hard drives, SSDs, and the like (647), may be connected through a system bus (648). In some computer systems, the system bus (648) may be accessible in the form of one or more physical plugs to enable extensions by additional CPUs, GPU, and the like. The peripheral devices may be attached either directly to the core's system bus (648) or through a peripheral bus 649. Architectures for a peripheral bus include PCI, USB, and the like.

CPUs (641), GPUs (642), FPGAs (643), and accelerators (644) may execute certain instructions that, in combination, may make up the aforementioned computer code. That computer code may be stored in ROM (645) or RAM (646). Transitional data may also be stored in RAM (646), whereas permanent data may be stored, for example, in the internal mass storage (647). Fast storage and retrieval to any of the memory devices may be enabled through the use of cache memory, which may be closely associated with one or more CPU (641), GPU (642), mass storage (647), ROM (645), RAM (646), and the like.

The computer-readable media may have computer code thereon for performing various computer-implemented operations. The media and computer code may be specially designed and constructed for the purposes of the present disclosure, or they may be of the kind well known and available to those having skill in the computer software arts.

As an example, and not by way of limitation, the computer system having architecture (600), and specifically the core (640), may provide functionality as a result of processor (s) (including CPUs, GPUs, FPGA, accelerators, and the like) executing software embodied in one or more tangible, computer-readable media. Such computer-readable media may be media associated with user-accessible mass storage as introduced above, as well as certain storage of the core (640) that are of non-transitory nature, such as core-internal mass storage (647) or ROM (645). The software implementing various embodiments of the present disclosure may be stored in such devices and executed by core (640). A computer-readable medium may include one or more memory devices or chips, according to particular needs. The software may cause the core (640) and specifically the processors therein (including CPU, GPU, FPGA, and the like) to execute particular processes or particular parts of particular processes described herein, including defining data structures stored in RAM (646) and modifying such data structures according to the processes defined by the software. In addition, or as an alternative, the computer system may provide functionality as a result of logic hardwired or otherwise embodied in a circuit (for example, accelerator (644)), which may operate in place of or together with software to execute particular processes or particular parts of particular processes described herein. Reference to software may encompass logic, and vice versa, where appropriate. Reference to a computer-readable media may encompass a circuit (such as an integrated circuit (IC)) storing software for execution, a circuit embodying logic for execution, or both, where appropriate. The present disclosure encompasses any suitable combination of hardware and software.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

The foregoing disclosure provides illustration and description, but is not intended to be exhaustive or to limit the implementations to the precise form disclosed. Modifications and variations are possible in light of the above disclosure or may be acquired from practice of the implementations.

It is understood that the specific order or hierarchy of blocks in the processes/flowcharts disclosed herein is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium may be a tangible device that may retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that may direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

The above disclosure also encompasses the embodiments listed below:

(1) A method performed by at least one processor of a network node that is connected to one or more additional network nodes via a local area network (LAN), the network node and the one or more additional network nodes forming a cloud, the method including: setting a first timer to a first value, the first timer being associated with determining whether one of the one or more additional network nodes is an active controller in the cloud; starting the first timer; determining, before the first timer expires, whether a first message that indicates the one of the one or more additional network nodes is the active controller is received; and based on determining the first message is received before the first timer expires, synchronizing with the one of the one or more additional network nodes that is the active controller, and restarting the first timer.

(2) The method according to feature (1), in which the synchronizing includes subscribing to the one of the one or more additional network nodes that is the active controller for status updates.

(3) The method according to feature (1) or (2), in which the synchronizing includes receiving one or more multicast updates from the one of the one or more additional network nodes that is the active controller.

(4) The method according to any one of features (1)-(3), in which the synchronizing includes polling the one of the one or more additional network nodes that is the active controller at a periodic interval for status updates.

(5) The method according to any one of features (1)-(4), in which the synchronizing includes synchronizing with a state of the one of the one or more additional network nodes that is the active controller to determine one or more of (i) a set of devices from the one or more additional devices requesting resources, (ii) a set of devices from the one or more additional devices operating as workers, (iii) a set of tasks, (iv) a set of tasks assigned to the set of devices from the one or more additional devices operating as workers, and (v) a set of results of the set of tasks assigned to the set of devices from the one or more additional devices operating as workers.

(6) The method according to any one of features (1)-(5), further including: based on the first timer expiring without the first message being received, assigning, as the active controller in the cloud, one or more tasks to at least one network node from the one or more additional network nodes.

(7) The method according to any one of features (1)-(6), further including: setting a second timer to a second value, based on the first timer expiring without the first message being received, starting the second timer; based on an expiration of the second timer or receiving a second message from another network node among the one or more additional network nodes requesting identification of the active controller, broadcasting, to each network node among the one or more additional network nodes, a second message indicating that the network node is the active controller in the cloud.

(8) An apparatus connected to one or more additional network nodes via a local area network (LAN), the apparatus and the one or more additional network nodes forming a cloud, the apparatus including: at least one memory configured to store computer program code; and at least one processor configured to access the computer program code and operate as instructed by the computer program code, the computer program code including: first setting code configured to cause the at least one processor to set a first timer to a first value, the first timer being associated with determining whether one of the one or more additional network nodes is an active controller in the cloud, first starting code configured to cause the at least one processor to start the first timer, determining code configured to cause the at least one processor to determine, before the first timer expires, whether a first message that indicates the one of the one or more additional network nodes is the active controller is received, synchronizing code, and restarting code, in which based on determining the first message is received before the first timer expires, the synchronizing code is configured to cause the at least one processor to synchronize with the one of the one or more additional network nodes that is the active controller, and the restarting code is configured to cause the at least one processor to restart the first timer.

(9) The apparatus according to feature (8), in which the synchronizing code is further configured to cause the at least one processor to subscribe to the one of the one or more additional network nodes that is the active controller for status updates.

(10) The apparatus according to feature (8) or (9), in which the synchronizing code is further configured to cause the at least one processor to receive one or more multicast updates from the one of the one or more additional network nodes that is the active controller.

(11) The apparatus according to any one of features (8)-(10), in which the synchronizing code is further configured to cause the at least one processor to poll the one of the one or more additional network nodes that is the active controller at a periodic interval for status updates.

(12) The apparatus according to any one of features (8)-(11), in which the synchronizing code configured to cause the at least one processor to synchronize with a state of the one of the one or more additional network nodes that is the active controller to determine one or more of (i) a set of devices from the one or more additional devices requesting resources, (ii) a set of devices from the one or more additional devices operating as workers, (iii) a set of tasks, (iv) a set of tasks assigned to the set of devices from the one or more additional devices operating as workers, and (v) a set of results of the set of tasks assigned to the set of devices from the one or more additional devices operating as workers.

(13) The apparatus according to any one of features (8)-(12), in which the computer program code further includes: assigning code, in which based on the first timer expiring without the first message being received, the assigning code is configured to cause the at least one processor to assign, as the active controller in the cloud, one or more tasks to at least one network node from the one or more additional network nodes.

(14) The apparatus according to any one of features (8)-(13), in which the computer program code further includes: second setting code configured to cause the at least one processor to set a second timer to a second value, starting code, and broadcasting code, in which based on the first timer expiring without the first message being received, the starting code is configured to cause the at least one processor to start the second timer, and in which based on an expiration of the second timer or receiving a second message from another network node among the one or more additional network nodes requesting identification of the active controller, the broadcasting code is configured to cause the at least one processor to broadcast, to each network node among the one or more additional network nodes, a second message indicating that the network node is the active controller in the cloud.

(15) A non-transitory computer readable medium having instructions stored therein, which when executed by a processor in a network node that is connected to one or more additional network nodes via a local area network (LAN), the network node and the one or more additional network nodes forming a cloud, causes the network node to execute a method including: setting a first timer to a first value, the first timer being associated with determining whether one of the one or more additional network nodes is an active controller in the cloud; starting the first timer; determining, before the first timer expires, whether a first message that indicates the one of the one or more additional network nodes is the active controller is received; and based on determining the first message is received before the first timer expires, synchronizing with the one of the one or more additional network nodes that is the active controller, and restarting the first timer.

(16) The non-transitory computer readable medium according to feature (15), in which the synchronizing includes subscribing to the one of the one or more additional network nodes that is the active controller for status updates.

(17) The non-transitory computer readable medium according to feature (15) or (16), in which the synchronizing includes receiving one or more multicast updates from the one of the one or more additional network nodes that is the active controller.

(18) The non-transitory computer readable medium according to any one of features (15)-(17), in which the synchronizing includes polling the one of the one or more additional network nodes that is the active controller at a periodic interval for status updates.

(19) The non-transitory computer readable medium according to any one of features (15)-(18), in which the synchronizing includes synchronizing with a state of the one of the one or more additional network nodes that is the active controller to determine one or more of (i) a set of devices from the one or more additional devices requesting resources, (ii) a set of devices from the one or more additional devices operating as workers, (iii) a set of tasks, (iv) a set of tasks assigned to the set of devices from the one or more additional devices operating as workers, and (v) a set of results of the set of tasks assigned to the set of devices from the one or more additional devices operating as workers.

(20) The non-transitory computer readable medium according to any one of features (15)-(19), further including: based on the first timer expiring without the first message being received, assigning, as the active controller in the cloud, one or more tasks to at least one network node from the one or more additional network nodes.

What is claimed is:

1. A method performed by at least one processor of a network node that is connected to one or more additional network nodes via a local area network (LAN), the network node and the one or more additional network nodes forming a local cloud within the LAN, the method comprising:
    setting, by the network node as an available controller, a first timer to a first value, the first timer being associated with determining whether one of the one or more additional network nodes is an active controller in the local cloud that assigns a set of tasks to the one or more additional network nodes;
    starting, by the network node as the available controller, the first timer;
    broadcasting, by the network node as the available controller, a first message to each of the one or more additional network nodes in the LAN, the first message requesting each of the one or more additional network nodes to indicate whether each of the one or more additional network nodes is the active controller;
    determining, by the network node as the available controller before the first timer expires, whether a second message that indicates the one of the one or more additional network nodes is the active controller is received in response to the first message;
    based on determining the second message is received before the first timer expires,
        synchronizing, by the network node as the available controller, with the one of the one or more additional network nodes that is the active controller, and
        restarting, by the network node as the available controller, the first timer; and
    based on the first timer expiring without the second message being received, assigning, by the network node as the active controller in the local cloud, one or more tasks of the set of tasks to at least one network node from the one or more additional network nodes.

2. The method according to claim 1, wherein the synchronizing includes subscribing to the one of the one or more additional network nodes that is the active controller for status updates.

3. The method according to claim 1, wherein the synchronizing includes receiving one or more multicast updates from the one of the one or more additional network nodes that is the active controller.

4. The method according to claim 1, wherein the synchronizing includes polling the one of the one or more additional network nodes that is the active controller at a periodic interval for status updates.

5. The method according to claim 1, wherein the synchronizing includes synchronizing with a state of the one of the one or more additional network nodes that is the active controller to determine one or more of (i) a set of network nodes from the one or more additional devices requesting resources, (ii) a set of network nodes from the one or more additional network nodes operating as workers, (iii) the set of tasks, (iv) the set of tasks assigned to the set of network nodes from the one or more additional network nodes operating as workers, and (v) a set of results of the set of tasks assigned to the set of network nodes from the one or more additional network nodes operating as workers.

6. The method according to claim 1, further comprising:
setting, by the network node as the active controller, a second timer to a second value,
based on the first timer expiring without the second message being received, starting, by the network node as the active controller, the second timer; and
based on an expiration of the second timer or receiving a third message from another network node among the one or more additional network nodes requesting identification of the active controller, broadcasting, by the network node as the active controller to each network node among the one or more additional network nodes, a fourth message indicating that the network node is the active controller in the local cloud.

7. An apparatus connected to one or more additional network nodes via a local area network (LAN), the apparatus and the one or more additional network nodes forming a local cloud within the LAN, the apparatus comprising:
at least one memory configured to store computer program code; and
at least one processor configured to access the computer program code and operate as instructed by the computer program code, the computer program code including:
first setting code configured to cause the at least one processor to set, as an available controller, a first timer to a first value, the first timer being associated with determining whether one of the one or more additional network nodes is an active controller in the local cloud that assigns a set of tasks to the one or more additional network nodes,
first starting code configured to cause the at least one processor to start, as the available controller, the first timer,
first broadcasting code configured to cause the at least one processor to, broadcast, as the available controller, a first message to each of the one or more additional network nodes in the LAN, the first message requesting each of the one or more additional network nodes to indicate whether each of the one or more additional network nodes is the active controller,
determining code configured to cause the at least one processor to determine, as the available controller before the first timer expires, whether a second message that indicates the one of the one or more additional network nodes is the active controller is received in response to the first message,
synchronizing code,
restarting code, and
assigning code,
wherein based on determining the second message is received before the first timer expires,
the synchronizing code is configured to cause the at least one processor to synchronize, as the available controller, with the one of the one or more additional network nodes that is the active controller, and
the restarting code is configured to cause the at least one processor to restart, as the available controller, the first timer, and
wherein the assigning code is configured to cause the at least one processor to, based on the first timer expiring without the second message being received, assign, by the network node as the active controller in the local cloud, one or more tasks of the set of tasks to at least one network node from the one or more additional network nodes.

8. The apparatus according to claim 7, wherein the synchronizing code is further configured to cause the at least one processor to subscribe to the one of the one or more additional network nodes that is the active controller for status updates.

9. The apparatus according to claim 7, wherein the synchronizing code is further configured to cause the at least one processor to receive one or more multicast updates from the one of the one or more additional network nodes that is the active controller.

10. The apparatus according to claim 7, wherein the synchronizing code is further configured to cause the at least one processor to poll the one of the one or more additional network nodes that is the active controller at a periodic interval for status updates.

11. The apparatus according to claim 7, wherein the synchronizing code configured to cause the at least one processor to synchronize with a state of the one of the one or more additional network nodes that is the active controller to determine one or more of (i) a set of network nodes from the one or more additional network nodes requesting resources, (ii) a set of network nodes from the one or more additional network nodes operating as workers, (iii) of the set of tasks, (iv) the set of tasks assigned to the set of network nodes from the one or more additional network nodes operating as workers, and (v) a set of results of the set of tasks assigned to the set of network nodes from the one or more additional network nodes operating as workers.

12. The apparatus according to claim 7, wherein the computer program code further includes:
second setting code configured to cause the at least one processor to set, as the active controller, a second timer to a second value,
second starting code, and
second broadcasting code,
wherein based on the first timer expiring without the second message being received, the second starting code is configured to cause the at least one processor to start, as the active controller, the second timer;
wherein based on an expiration of the second timer or receiving a third message from another network node among the one or more additional network nodes requesting identification of the active controller, the second broadcasting code is configured to cause the at least one processor to broadcast, as the active controller to each network node among the one or more additional network nodes, a fourth message indicating that the network node is the active controller in the local cloud.

13. A non-transitory computer readable medium having instructions stored therein, which when executed by a processor in a network node that is connected to one or more additional network nodes via a local area network (LAN), the network node and the one or more additional network nodes forming a local cloud within the LAN, causes the network node to execute a method comprising:
- setting, by the network node as an available controller, a first timer to a first value, the first timer being associated with determining whether one of the one or more additional network nodes is an active controller in the local cloud that assigns a set of tasks to the one or more additional network nodes;
- starting, by the network node as the available controller, the first timer;
- broadcasting, by the network node as the available controller, a first message to each of the one or more additional network nodes in the LAN, the first message requesting each of the one or more additional network nodes to indicate whether each of the one or more additional network nodes is the active controller;
- determining, by the network node as the available controller before the first timer expires, whether a second message that indicates the one of the one or more additional network nodes is the active controller is received in response to the first message;
- based on determining the second message is received before the first timer expires,
  - synchronizing, by the network node as the available controller, with the one of the one or more additional network nodes that is the active controller, and
  - restarting, by the network node as the available controller, the first timer; and
- based on the first timer expiring without the second message being received, assigning, by the network node as the active controller in the local cloud, one or more tasks of the set of tasks to at least one network node from the one or more additional network nodes.

14. The non-transitory computer readable medium according to claim 13, wherein the synchronizing includes subscribing to the one of the one or more additional network nodes that is the active controller for status updates.

15. The non-transitory computer readable medium according to claim 13, wherein the synchronizing includes receiving one or more multicast updates from the one of the one or more additional network nodes that is the active controller.

16. The non-transitory computer readable medium according to claim 13, wherein the synchronizing includes polling the one of the one or more additional network nodes that is the active controller at a periodic interval for status updates.

17. The non-transitory computer readable medium according to claim 13, wherein the synchronizing includes synchronizing with a state of the one of the one or more additional network nodes that is the active controller to determine one or more of (i) a set of network nodes from the one or more additional network nodes requesting resources, (ii) a set of network nodes from the one or more additional network nodes operating as workers, (iii) of the set of tasks, (iv) the set of tasks assigned to the set of network nodes from the one or more additional network nodes operating as workers, and (v) a set of results of the set of tasks assigned to the set of network nodes from the one or more additional network nodes operating as workers.

* * * * *